W. D. DYE.
ANIMAL TRAP.
APPLICATION FILED JAN. 30, 1911.
999,705.
Patented Aug. 1, 1911.
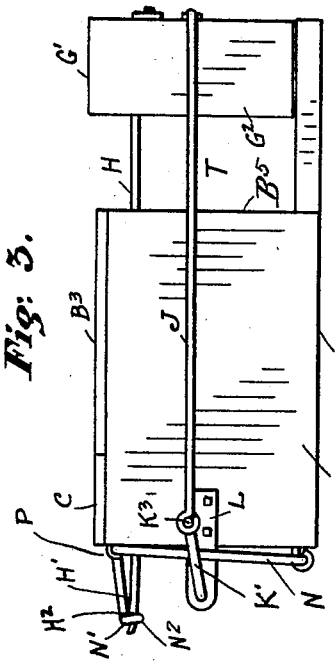
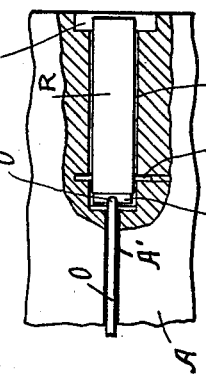
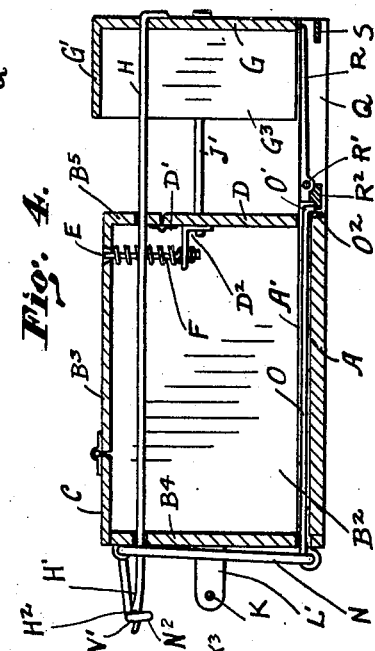
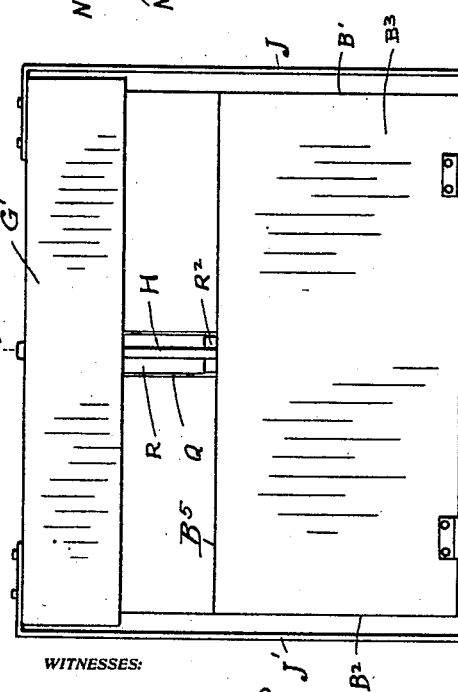
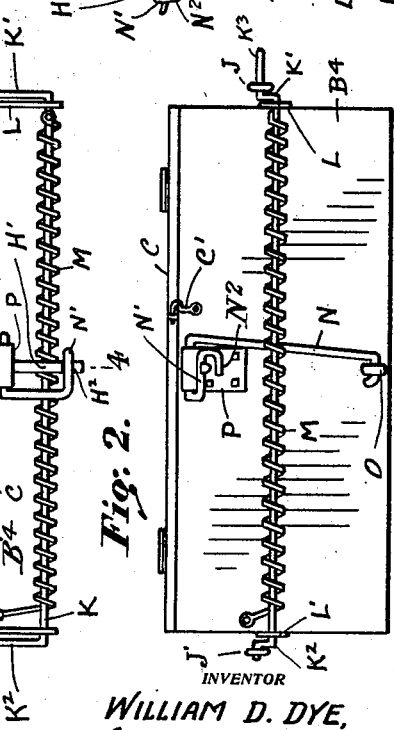
WITNESSES:
Ellis Wright
Edna G. Gentry
INVENTOR
WILLIAM D. DYE,
Thomas L Ryan
ATTORNEY

UNITED STATES PATENT OFFICE.

WILLIAM D. DYE, OF FOWLERTON, INDIANA.

ANIMAL-TRAP.

999,705.

Specification of Letters Patent. Patented Aug. 1, 1911.

Application filed January 30, 1911. Serial No. 605,353.

*To all whom it may concern:*

Be it known that I, WILLIAM D. DYE, a citizen of the United States, residing at Fowlerton, in the county of Grant and State of Indiana, have invented certain new and useful Improvements in Animal-Traps, of which the following is a specification.

This invention relates to improvements in traps of that character intended for the trapping of the smaller animals, and has for its especial object to provide a trap that will be effective in the trapping of rats.

Having sought for many years, a way to abate the rat nuisance, and after having used many different styles of traps without substantial success, I set to work to construct a trap that would be effective. The rat, especially when matured, by reason of his cunning and acute senses, is very difficult of capture. Notwithstanding this fact, however, this animal has natural instincts and tendencies which may be taken advantage of. Through study of the rodent and its habits, including the well known common rat, it is known that the rat in its migrations has no aversion to passing through a crack, or between walls, or through an open or a restricted space between objects of any kind, and that in passing an object having an opening extending through same, it will go through said opening rather than to go around the object. With a knowledge of these facts in view and with a purpose to provide a trap which will be effective and durable and which will be economical of construction, my present invention has been developed and it consists of the new construction, combination and arrangement of parts illustrated in the accompanying drawings, defined in the appended claims, and described in this specification.

In the drawings similar characters of reference refer to the several parts throughout the views, in which—
Figure 1 is a plan view, and Fig. 2 is a front view of my improved trap. Fig. 3 is a side view, and Fig. 4 is a vertical central sectional view taken on the line 4—4 in Fig. 1. Fig. 5 is a plan view of a portion of the base plate A, a portion thereof being shown in section to disclose the construction and arrangement of the trip plate R and the trip bar O.

Mounted on the base plate A is a compartment of suitable proportions formed by the sides $B^1$ and $B^2$, the top $B^3$, and the ends $B^4$ and $B^5$. A door C, will afford access to the interior of the compartment and may be secured at closed position by a hook $C^1$. D designates a door carried by hinges $D^1$, and which extends substantially the entire length of the rear end of the compartment. Carried by a bracket $D^2$, is the upright stem E, which will work through a hole therefor in the top $B^3$. A coil spring F carried by this stem and between the top $B^3$ and the bracket $D^2$, will hold the door D yieldingly at the closed position as shown in Fig. 4. Adapted to be moved slidingly on the said base board is a closure head composed of the back board G; the top $G^1$, and the ends $G^2$ and $G^3$. Disposed centrally and above the door D is a rod H, which has its rear end fastened to the closure head. This rod is capable of moving freely through openings therefor in the ends $B^5$ and $B^4$ of the compartment. The front end of this rod has the gentle curve $H^1$, and the notch $H^2$. Links J and $J^1$ having connections with the closure head have their front ends loosely connected to the cranks $K^1$ and $K^2$ of the transverse shaft K, which is journaled in the blocks L and $L^1$, that are supported by the compartment walls.

A strong coil spring M having its one end fixed or secured to the compartment, and its other end connected to the shaft K, affords such tension for the latter that when free to act, the spring will turn the shaft K rotatively and will thereby move the closure head. By my present invention such control of this actuating element or spring M is had, that it may be released for action, and then checked, whereby the closure head will be caused to shoot forwardly, and will be as quickly returned to and set at the normal position shown in the drawings. To hold the closure head at the normal position and against the tendency of the spring to move it forwardly is the function of the release arm N. This release arm has the form as shown in Fig. 2; its lower end is connected loosely to the forward end of the trip bar O, and its upper portion is turned at an angle and is journaled in a bearing plate P. This bearing plate also affords a bearing for the end of the rod H. The extended upper portion of the release arm is turned forwardly then at a right angle to form the finger $N^1$, which will engage the notch $H^2$ in the rod H. The function of the return bend $N^2$ of the said finger $N^1$ will be presently referred to.

The trip bar O lies loosely in a channel $A^1$ provided therefor in the base plate; its rear end is bent at an abrupt angle and forms a hook $O^1$. To afford a durable bearing for the rear end of this trip bar, I provide a short transverse metal plate $O^2$ secured by screws or small nails to the base plate. This plate extends across the front end of a longitudinal slot Q in the base plate. R designates a trip plate disposed in this groove and pivotally supported on a pin $R^1$. This trip plate is so balanced by a weight $R^2$ that it will occupy the normal horizontal position as shown in Fig. 4. The edge of the weight $R^2$ will so register underneath the hook $O^1$, that with the slightest depression of the trip plate the said hook will be raised. The transverse plate S serves as a check for the free end of the trip plate when the latter is depressed.

To set the trap for operation, the trip plate is depressed, the trip bar hook $O^1$ being thereby raised above the plane of the plate $O^2$. The finger $N^1$ may be then easily held clear of the notch $H^2$. By rotating the bar K by the crank handle $K^3$, the desired tension for the spring M may be obtained. The replacement then of the finger $N^1$ at the notch $H^2$ holds the rod H and the hook $O^1$ will drop into engagement with the plate $O^2$ as shown in Fig. 4. By the arrangement of a spring of the kind, and in the manner as shown, sufficient energy may be had to operate this trap a number of times without the necessity of resetting. The desired tension for the spring having been obtained, the trap is now in readiness to be operated. It is intended for use with or without bait. In case bait is used it may be deposited at any location inside the closure head on the base plate.

When the trip plate is depressed by the animal passing through the space T, the hook $O^1$ is moved out of its position, thus loosening the connection of the finger $N^1$ at the notch $H^2$. The spring M being thus released, the cranks $K^1$ and $K^2$ will operate. This movement of the cranks shoots the closure head forwardly; the animal's escape is cut off by the ends of the closure head, and it is forced against the door D which opens readily, the stem E moving upwardly and projecting above the top $B^3$. The front edge of the top $G^1$ will strike the stem E and the travel forwardly of the closure head will not have been completed until the animal has entirely cleared the door. The animal having passed into the compartment and clear of the door, the latter will be forced to the closed position by the spring F. The stem E having passed back to normal position the closure head then proceeds forwardly and as it reaches the limit of its forward movement, the cranks $K^1$ and $K^2$ pass the dead center and the closure head moves rearwardly. In the aforesaid movement forwardly of the rod H the underside of the said rod will have engaged the return bend $N^2$ of the finger $N^1$ thereby lowering the finger $N^1$ and shifting the trip bar O to its normal position whence the hook $O^1$ drops into engagement with the plate $O^2$. As the said bar H reaches the limit of its rearward travel the curved face $H^1$ gradually tightens against the finger $N^1$ before reaching the notch $H^2$ into which it drops and sets or holds the closure head at the normal rearward position shown in the drawings. By having the gradual tightening contact of the rod H and finger $N^1$ the speed of the rearward movement of the closure head is lessened whereby undue jolt or shock to the several parts is prevented.

What I claim as my invention and desire to secure by Letters Patent, is:—

1. An animal trap, comprising a base plate, a compartment mounted thereon, a hinged door in the rear side of said compartment, means to hold said door in closed position, a closure head to move reciprocatingly on said base plate and disposed opposite the rear side of said compartment, a pin moved by said door when opened, to project outside the compartment to stop the travel forwardly of the closure head until the door is closed, a shaft journaled at the front side of the compartment and having a crank on its ends, links between the cranks and the closure head, a coil spring to actuate said shaft, a notched member carried by the closure head, a holding means to engage the notched member when the closure head is at retracted position, a trip plate in the base plate at location between the compartment and the closure head to release the holding means.

2. An animal trap, comprising a base plate, a compartment mounted thereon, a hinged door in the rear side of said compartment, means to hold said door in closed position, a closure head to move reciprocatingly on said base plate and disposed opposite the rear side of said compartment, a pin moved by said door when opened to project outside the compartment to stop the travel forwardly of the closure head until the door is closed, a shaft journaled at the front side of the compartment and having cranks on its ends, links between the cranks and the closure head, a coil spring to actuate said shaft, a notched member carried by the closure head, means to normally hold the notched member, a trip plate in the base plate, connections between the trip plate and the notched member which will release the notched member when the trip plate is actuated.

3. An animal trap comprising a base plate, a compartment on said base plate, a door in the rear side of said compartment, a spring to hold the door normally closed, a pin to work through a hole in the top of this compartment and which will be projected therethrough when the door is open, a shaft journaled at the front end of the compartment and having a crank at each end, a coil spring to actuate said shaft, a link loosely connected to each of the said cranks, and having their rear ends connected to the closure head, a rod connected to the closure head and having its front end positioned to work through the front wall of the compartment and having a notch therein, a bell crank journaled at the said front wall, the end of one arm thereof being adapted to engage said notch, a trip bar having its front end loosely connected to the other arm of said bell crank, and a trip plate in the base plate between the compartment and the closure head to move the rear end of the trip bar out of the said recess.

In testimony whereof I affix my signature in presence of two witnesses.

WILLIAM D. DYE.

Witnesses:
THOMAS L. RYAN,
JOHN R. HANKS.

---

Copies of this patent may be obtained for five cents each, by addressing the "Commissioner of Patents, Washington, D. C."